UNITED STATES PATENT OFFICE.

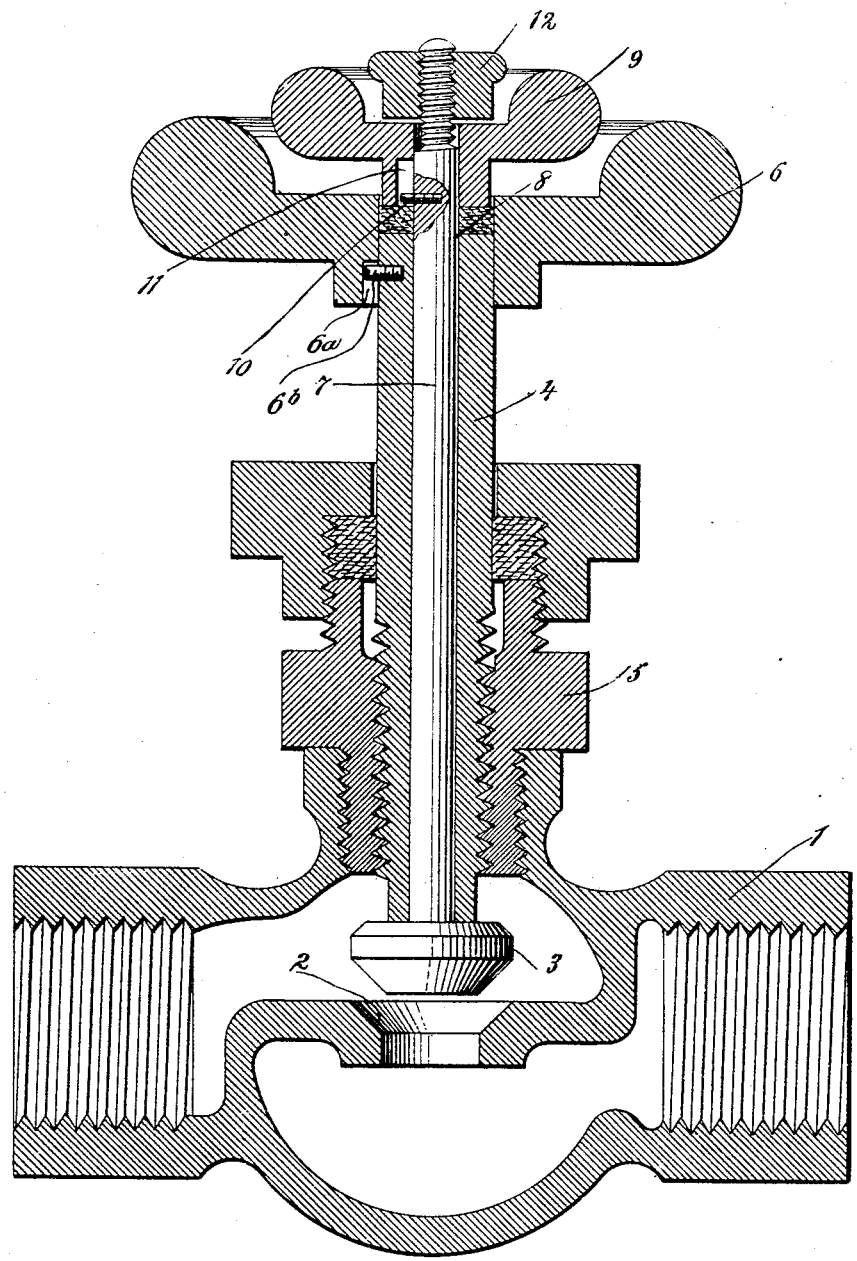

OLE SWENSON, SR., OF CRESCO, IOWA.

VALVE MECHANISM.

SPECIFICATION forming part of Letters Patent No. 710,905, dated October 7, 1902.

Application filed September 20, 1901. Serial No. 75,682. (No model.)

*To all whom it may concern:*

Be it known that I, OLE SWENSON, Sr., a citizen of the United States, and a resident of Cresco, in the county of Howard and State of Iowa, have invented a certain new and useful Valve Mechanism, of which the following is a full, clear, and exact description.

My invention seeks to provide a means whereby grit may be removed from a valve-seat and the valve reground without the necessity of removing the valve from its mounting; and to this end I provide the valve with two stems, one of which is hollow and which serves to raise and lower the valve from its seat and the other of which serves to rotate the valve and grind its surface on the seat.

The invention consists of novel features and parts and combinations of the same, as will be fully described hereinafter and then pointed out in the claim.

A practical embodiment of the invention is represented in the accompanying drawing, in which the figure represents a partial longitudinal section of my valve mechanism.

Within the pipe 1 a valve-seat 2 is formed which is adapted to receive a valve 3. Said valve is adapted to be raised and lowered by a hollow valve-stem 4, which is independent of the valve 3 and which is screw-threaded in a stuffing-box 5. Said hollow stem 4 is operated by the usual hand-wheel 6. The hand-wheel 6 is formed with a slot $6^a$ in its hub, said slot receiving a pin $6^b$, projecting from the hollow valve-stem 4, by reason of which construction the hand-wheel and the stem are simultaneously rotated. Rigidly connected or formed with the valve 3 is a solid auxiliary stem 7, passing through the hollow stem 4 and through a packing 8, held in a recess in the center of the hand-wheel 6. The valve-stem 7 is turned by means of the hand-wheel 9 bearing on the packing 8. A pin 10 projects laterally from the stem 7 into a slot or recess 11 of the hub of the hand-wheel 9, the pin serving to impart the rotary movement of the hand-wheel 9 to the stem 7. The outer end of the stem 7 is threaded to receive a nut or thumb-screw 12, by means of which the packing 8 can be adjusted.

When it is desired to seat or unseat the valve, the hand-wheel 6 is turned to screw the hollow stem 4 inwardly, thereby carrying the valve 3 to its seat 2. In unseating the valve the hand-wheel 6 is turned in the opposite direction, thereby screwing the stem 4 outward away from the valve-seat. When the hand-wheel 6 engages the hand-wheel 9, a further rotation of the hand-wheel 6 will unseat the valve. Should grit settle on the valve-seat, the valve is slightly loosened by means of the hand-wheel 6, whereupon the hand-wheel 9 is turned to grind the valve on its seat until all grit is removed, the stem 7 serving to turn the valve with the hand-wheel 9.

Having thus described my invention, I claim as new and desire to secure by Letters Patent—

The combination substantially as described of the hollow stem provided at its outer end with a hand-wheel and concentrically with said hand-wheel with a recess and with packing therein, the valve-stem extending within said hollow stem and beyond the outer end thereof and threaded to receive the nut 12, the nut 12 on the said stem, the hand-wheel on said valve-stem between the nut 12 and the packing and provided on its inner side with a tubular extension bearing at its extremity against the packing and provided internally with a longitudinal groove, a pin on the valve-stem entering said groove, the hand-wheel of the stem being arranged for adjustment longitudinally along the stem and along the pin projecting therefrom by the operation of the nut 12 in adjusting the packing substantially as set forth.

In witness whereof I have signed my name to this specification in the presence of two subscribing witnesses.

OLE SWENSON, SR.

Witnesses:
E. H. SHUTTLEWORTH,
H. W. SHUTTLEWORTH.